United States Patent
Ciarlante et al.

(10) Patent No.: US 6,594,819 B1
(45) Date of Patent: Jul. 15, 2003

(54) METHOD AND SYSTEM FOR ESTABLISHING COLLECTION OF HOSTABLE APPLICATIONS

(76) Inventors: John J. Ciarlante, Shrewsbury; Orlando C. Montalvo-Huhn, Lowell; Koah-Hsing Wang, Winchester; Alan Rodgers, Melrose; Steven Brand, Cambridge, all of MA (US)

(*) Notice: Subject to any disclaimer, the term of this patent is extended or adjusted under 35 U.S.C. 154(b) by 0 days.

(21) Appl. No.: 09/237,157

(22) Filed: Jan. 25, 1999

(65) Prior Publication Data

(65)

(51) Int. Cl.⁷ ............................................. G06F 9/455
(52) U.S. Cl. ............................. 717/11; 717/1; 705/203
(58) Field of Search .................. 717/1, 11, 3; 707/203, 707/513, 516, 530, 8; 703/23; 705/3; 710/14

(56) References Cited

U.S. PATENT DOCUMENTS

| | | | |
|---|---|---|---|
| 4,485,440 A | 11/1984 | Duff et al. ................... 713/600 |
| 4,791,565 A | 12/1988 | Dunham et al. ............. 713/200 |
| 4,999,806 A | 3/1991 | Chernow et al. ............ 717/177 |
| 5,047,919 A | 9/1991 | Sterling et al. ............... 714/47 |
| 5,083,309 A | 1/1992 | Beysson ...................... 705/55 |
| 5,231,566 A | * 7/1993 | Blutinger et al. ............. 705/27 |
| 5,291,596 A | 3/1994 | Mita ............................. 707/8 |
| 5,386,369 A | 1/1995 | Christiano .................. 705/400 |

(List continued on next page.)

OTHER PUBLICATIONS

Roseman et al, "TeamRooms: network places for collaboration", ACM CSCW, pp 325–333, 1996.*
Schuckmann et al., "Designing object orienetd synchronous groupware with COAST", ACM CSCW, pp 30–38, 1996.*
Mandviwalla et al, "TeamBox: An exploration of collaborative interoperability", ACM COOCS, pp 347–353, 1995.*

*Primary Examiner*—Anil Khatri

(57) ABSTRACT

A method for establishing a collection of application software programs capable of being hosted by a user. Application kits for software applications are received, each application kit including executable application files and additional application related data. For each software application contained in an application kit, one or more offerings are created, each offering including at least some of the additional application related data in the application kit and pricing terms for hosting of the application, and a server upon which the software application may be hosted is identified. The offerings are published on a computer accessible to the user to thereby allow the user to select an offering and host the software application relating thereto on the identified server. A plurality of offerings may be created for any software application. The offerings may be organized into a plurality of catalogs of related software applications.

28 Claims, 11 Drawing Sheets

U.S. PATENT DOCUMENTS

| | | | | |
|---|---|---|---|---|
| 5,388,211 A | | 2/1995 | Hornbuckle | 717/178 |
| 5,416,840 A | * | 5/1995 | Cane et al. | 705/52 |
| 5,475,585 A | | 12/1995 | Bush | 705/26 |
| 5,497,479 A | | 3/1996 | Hornbuckle | 463/29 |
| 5,499,340 A | | 3/1996 | Barritz | 714/47 |
| 5,528,490 A | * | 6/1996 | Hill | 717/11 |
| 5,583,993 A | | 12/1996 | Foster et al. | 709/205 |
| 5,590,056 A | | 12/1996 | Barritz | 702/186 |
| 5,613,089 A | | 3/1997 | Hornbuckle | 711/164 |
| 5,649,187 A | | 7/1997 | Hornbuckle | 707/10 |
| 5,666,493 A | * | 9/1997 | Wojcik et al. | 705/26 |
| 5,680,615 A | * | 10/1997 | Marlin et al. | 707/103 |
| 5,740,439 A | * | 4/1998 | Atkinson et al. | 709/320 |
| 5,754,761 A | | 5/1998 | Willsay | 358/1.9 |
| 5,754,782 A | * | 5/1998 | Masada | 709/213 |
| 5,758,110 A | | 5/1998 | Boss et al. | 945/751 |
| 5,761,651 A | | 6/1998 | Hasebe et al. | 945/400 |
| 5,765,143 A | * | 6/1998 | Sheldon et al. | 705/28 |
| 5,771,354 A | | 6/1998 | Crawford | 709/229 |
| 5,790,664 A | | 8/1998 | Coley et al. | 709/203 |
| 5,790,847 A | * | 8/1998 | Fisk et al. | 707/4 |
| 5,819,092 A | * | 10/1998 | Ferguson et al. | 717/1 |
| 5,845,065 A | | 12/1998 | Conte et al. | 713/209 |
| 5,862,377 A | * | 1/1999 | Lee | 709/329 |
| 5,870,717 A | * | 2/1999 | Wiecha | 705/26 |
| 5,894,571 A | * | 4/1999 | O'Connor | 404/97 |
| 5,913,032 A | * | 6/1999 | Schwartz et al. | 709/213 |
| 5,936,860 A | * | 8/1999 | Arnold et al. | 700/95 |
| 5,987,376 A | * | 11/1999 | Olson et al. | 701/201 |
| 6,108,703 A | * | 8/2000 | Leighton et al. | 709/206 |
| 6,145,001 A | * | 11/2000 | Scholl et al. | 709/223 |
| 6,189,138 B1 | * | 2/2001 | Fowlow et al. | 717/1 |
| 6,223,177 B1 | * | 4/2001 | Tatham et al. | 707/9 |
| 6,321,252 B1 | * | 11/2001 | Bhola et al. | 709/204 |

* cited by examiner

METHOD AND SYSTEM FOR ESTABLISHING COLLECTION OF HOSTABLE APPLICATIONS

RELATED APPLICATIONS

This application is related to patent application Ser. No. 08/257,134, titled Method and System for Hosting Applications, filed Jan. 25, 1999, now pending, which is hereby incorporated by reference into this application.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND OF THE INVENTION

The invention disclosed herein relates to workgroup application software. In particular, the present invention relates to methods and systems for providing users with access to a variety of workgroup applications on a subscription basis and the ability to host the applications for other users.

Workgroup or groupware software applications, which provide multiple users with the ability to collaborate on projects, are extremely powerful and increasingly popular tools for the performance of work by teams of people. Many such applications are available for such tasks as editing documents, holding chats and discussions, networking employment opportunities, managing accounts, providing help, and holding auctions, to name a few.

Traditionally, the use of a groupware application required the license of a groupware software product and the installation of the product on a server computer and possibly the client computers of the users. This limited the availability of groupware to those with the computer and financial resources to obtain and set up the necessary hardware and software components. A new type of groupware, termed user initiated groupware or UIG, was introduced in the form of the Instant!TEAMROOM™ groupware available from Lotus Development Corp. of Cambridge, Mass. Using the Instant!TEAMROOM™ groupware, a user having a personal computer and access to the Internet can set up a secure collaboration site, choose the team members, invite them in, and collaborate on a project by sharing documents and conversations. The user setting up the collaboration site subscribes to the use of the Instant!TEAMROOM™ software by paying for the time the users actually use the collaboration site, thus saving on the expense of purchasing the necessary hardware and software.

While this user initiated groupware product provides some benefits over existing groupware, it fails to account for the many types of groupware applications and the variety of tasks and projects they support. Indeed, many other types of groupware applications can not take advantage of the benefits of the UIG model without significant modifications.

There is therefore a need for a comprehensive framework for allowing traditional groupware applications to become user initiated groupware software and for offering such groupware to users for application hosting. The present invention provides such a framework.

SUMMARY OF THE INVENTION

It is an object of the present invention to solve the problems described above with existing groupware applications.

It is another object of the present invention to provide a framework for converting groupware applications into a form which may be initiated and hosted by users.

It is another object of the present invention to provide a tool for software vendors to convert groupware applications into a form ready for user initiated hosting.

It is another object of the present invention to provide a practical, cost-effective way to use the world wide web as a vehicle for collaboration.

It is another object of the present invention to allow service providers the flexibility to offer user initiated groupware applications on a variety of different financial and legal terms.

It is another object of the present invention to provide a financial model for renting and hosting user initiated groupware applications.

Some of the above and other objects are achieved by a method for establishing a collection of application software programs capable of being hosted by a user. The method involves receiving on a computer system application kits for software applications, each application kit including executable application files and additional application related data such as marketing or technical information. The application kits may be stored in an application database.

For each software application contained in an application kit, one or more offerings are created, each offering including at least some of the additional application related data in the application kit and pricing terms for hosting of the application. The offerings are published on a computer accessible to the user to thereby allow the user to select an offering and host the software application relating thereto on the identified server.

In addition, for each software application contained in an application kit, a server upon which the software application may be hosted is identified and may be contained in the offering. For a given offering, the executable application files in the application kit are copied to the server identified in the offering, to prepare the application for hosting on the server. A private copy of the application, referred to herein as an application instance, is created on the host server once the user orders the application.

In accordance with one aspect of the invention, a plurality of offerings may be created for any software application. The offerings may contain different pricing terms. For example, an application may be offered to the general public at list price, requiring a credit card for payment, and the same application may also be offered to a site licensee from a private web page at a volume price to be charged to a standing purchase order.

The offerings may be organized into a plurality of catalogs of related software applications. The offerings may alternatively be organized into classes of offerings intended for particular users, such as in classes organized by pricing terms, and access to each class may be limited to the particular users intended therefor. Thus, drawing from the pool of applications stored in the warehouse or inventory, the host such as a service provider can create different groupings such that catalogs may be constructed for general business, vertical markets, site agreements, special promotions, single vendor, etc.

BRIEF DESCRIPTION OF THE DRAWINGS

The invention is illustrated in the figures of the accompanying drawings which are meant to be exemplary and not limiting, in which like references refer to like or corresponding parts, and in which.

DETAILED DESCRIPTION OF THE PREFERRED EMBODIMENTS

Preferred embodiments of the present invention are now described with reference to the drawings in the Figures.

Figure 1:
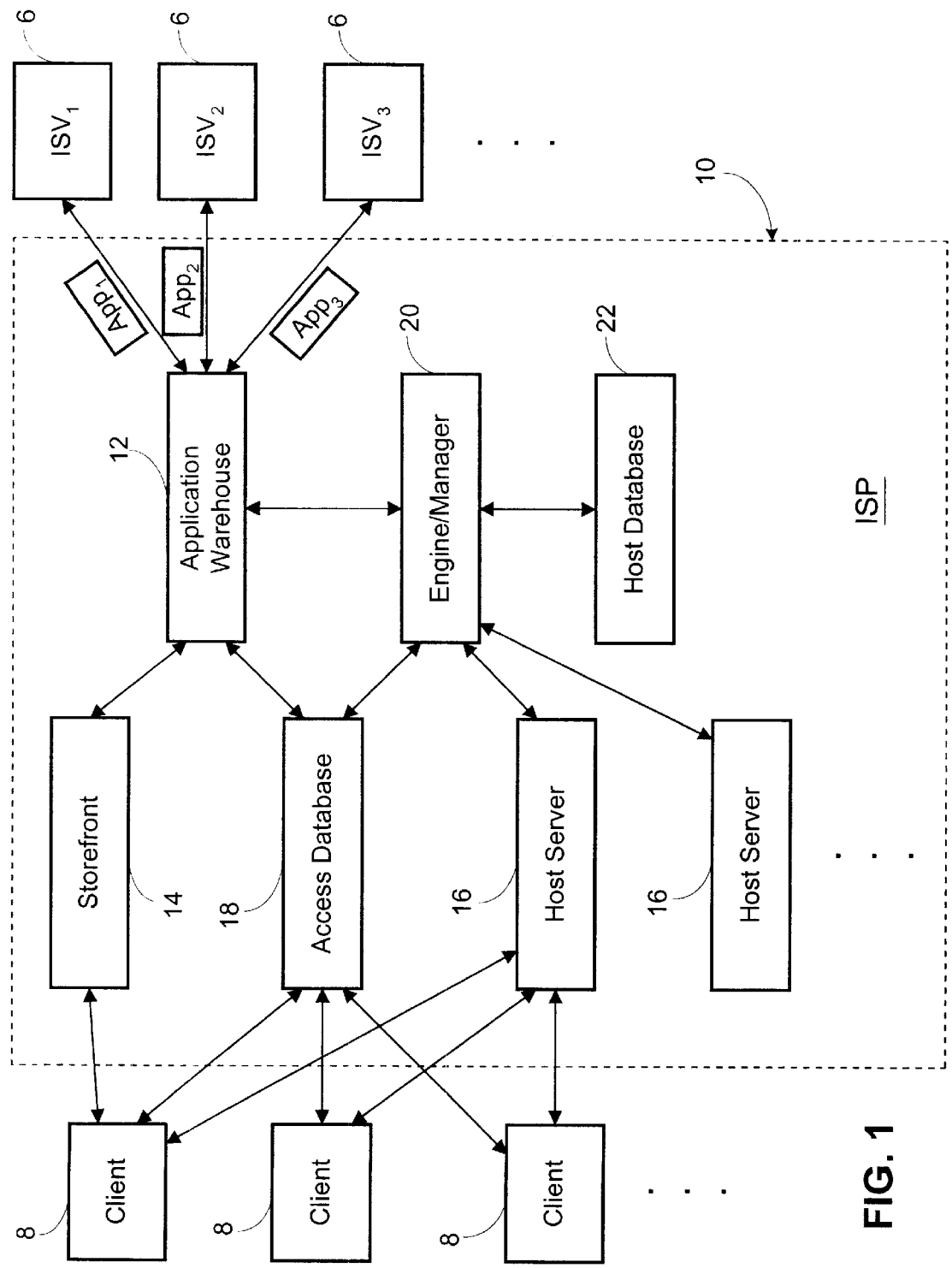
FIG. 1 shows a block diagram of a hosting system in accordance with one embodiment of the present invention.

Referring to FIG. 1, a hosting system 10 of the present invention is a multiserver environment connectable to a number of independent software vendors ("ISV"s) 6 and clients 8 such as over the Internet or other network. The ISVs 6 provide groupware applications to the hosting system 10 in the form of application kits containing bundled files of executable and other files needed for execution of the application as well as additional application related data including marketing information about and a technical profile of the ISV's application. The groupware applications provided by the ISVs 6 are available for rental use by clients 8 through the hosting system 10 in accordance with the systems and methods described below.

The hosting system, such as an Internet Service Provider or ISP, contains a number of components distributed over multiple servers. The hosting system 10 contains an application warehouse 12 which is a database storing the application kits provided by the ISVs 6. Particular offerings to use the applications stored in the warehouse 12 are published in the storefront 14, as explained below, which may be a web server storing web pages containing the offerings. Users of clients 8 make selections of groupware applications through the offerings in the storefront 14, and the applications are hosted in one of any number of dedicated host servers 16 contained in the hosting system 10.

The hosting system 10 also contains an access database 16 which provides for registration of and payment by clients 8. That is, the initial user hosting an application must register and establish an account to pay for use of the hosted application, and subsequent users invited by the initial user to join the hosted application must register and may also need to establish payment accounts. The access database 18 exchanges user and account data with a host database 22 stored in the hosting system 10. If the hosting system is an ISP, the ISP stores a database 22 containing user and account data regarding its existing customers, which may be provided to the access database 18. An engine and management system 20 passes data between the access database 18 and host database 22 as well as other distributed messages between hosting system components and generally manages the processes involved in hosting applications.

Figure 2:
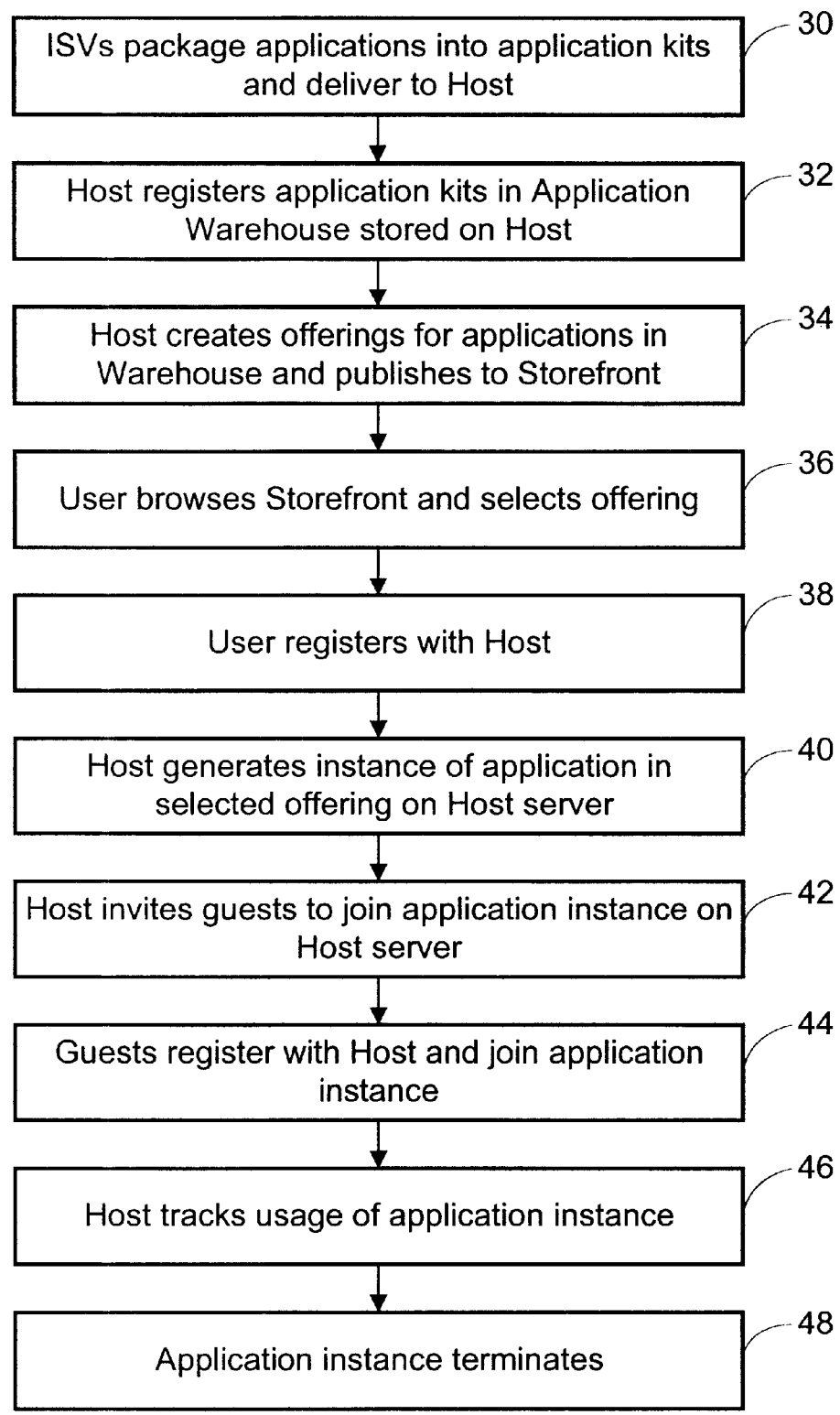
FIG. 2 is a flow chart showing a process of allowing users to select and host an application in accordance with one embodiment of the present invention.

A general overview of the process of providing applications for hosting is shown in FIG. 2. An ISV packages its application into an application kit, step 30, which includes the executable files and other files necessary for execution of the application as well as marketing information to be presented to users and a technical profile which may be used by the host to determine which hosting servers may be used. The application kits from ISVs are delivered to the hosting system 10, such as by transmission over the Internet. The hosting system registers and stores the application kits in the warehouse 12, step 32.

The hosting system then creates one or more offerings, also referred to herein as syndicates, for each application and publishes these offerings to the storefront, step 34. Each offering preferably includes the ISV's marketing information retrieved from the application kit and an agreement setting forth pricing terms for rental or hosting of the application as well as other legal terms, if appropriate. In some embodiments, the offerings further include the identity of the hosting server 16 to be used for hosting the application pursuant to the offering. For example, a higher capacity or faster server may be coupled with higher pricing terms in an offering.

As a result, the storefront contains a listing of a number of offerings of groupware applications which may be hosted. A user browses the storefront, such as through standard web browsers when the storefront consists of a collection of web pages, and selects one of the offerings, step 36. The user registers with the hosting system to be properly identified and to establish means of payment, and further identifies one or more invited users or guests to be invited to join the hosted application, step 38. The hosting system generates an instance of the application identified in the selected offering on a host server 16, step 40, which may be the host server identified in the offering, if any, or another technically appropriate and available server.

The hosting system or application sends messages to the invited guests to join the application instance on the host server, step 42. The guests register with the host server, which may include making payment arrangements, and can then join and use the instance of the groupware application, step 44. The host system 10 tracks the usage of the application instance, step 46, and stores the results in the host database for accounting, billing and logging purposes. The application instance may terminate in a variety of ways, step 48, including by the users exiting the application, the application rental terms expiring, or the user's account being depleted.

One particular embodiment of the hosting system of the present invention is implemented as a platform based upon the Domino™ messaging and web application server platform available from Lotus Development Corp., which is familiar to those of skill in the art. The system, known by the name Domino Instant! Host™ or DIH, includes system services for application registration, user registration, usage tracking and reporting, and data synchronization. The DIH platform serves as an application distribution system, supporting hundreds of thousands of users and thousands of applications in a shared server farm. Inventory consists of application templates, and the DIH platform generates applications on demand, tracks their usage, and supplies tagged data so that invoices can be generated and royalties paid.

Figure 3:
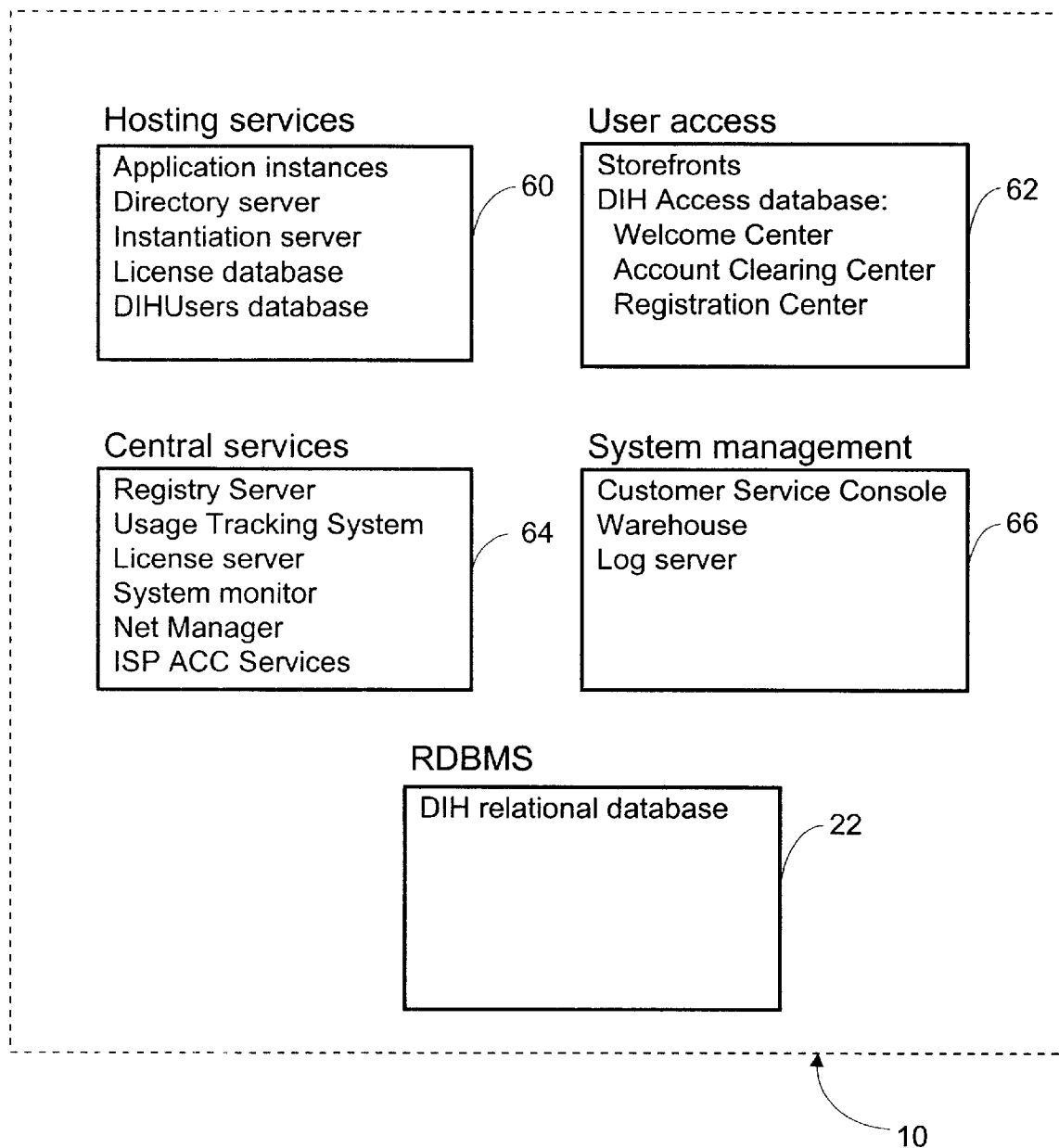
FIG. 3 is a block diagram showing server components of the hosting system of FIG. 1 in accordance with one embodiment of the present invention.

FIG. 3 shows the four major components of the DIH platform of a preferred embodiment of the hosting system 10, as well as a relational database management system 22 provided by the ISP acting as host. The components include hosting services 60, which create and manipulate application instances; user access functions 62, which allow users to rent and join applications; central services 64, which collect usage data, track users and instances, and communicate with the DIH database 22; system management functions The hosting services 60 contain the following components:

Application instances, which are copies of an application that users have rented.

The DIHUsers database, a cascaded Public Address Book that contains Person documents for all users that have instances on a particular Hosting server (this design minimizes the size of the Public Address Book (Names.NSF) on each of the Hosting servers).

The Directory server, which makes changes to the Public Address Books (typically Names.(NSF and DIHUsers.NSF), such as adding Person documents or changing Group entries.

The Instantiation server, which creates Notes databases for new application instances.

The License database, which manages of user instance months or UIMS, as described further below.

The user access components 62 contain Storefronts for customers to browse to determine the available applications, and a DIH Access database, which contains the Account Clearing Center, Registration Center, and Welcome Center. A storefront is a Notes database or set of HTML pages that the service provider users to present the list of available application offers, called syndicates. A single application can have multiple syndicates, and multiple storefronts can be used to present the offers to customers.

Customers visit the storefront using a Web browser, browse the marketing materials, and decide to order an application. They are then prompted (from the Registration Center and Account Clearing Center) to enter registration and account information.

The Account Clearing Center, Registration Center, and Welcome Center are used to welcome and register customers and, through a link to the service provider back-end systems, establish customer accounts. The sequence in which customers pass through these centers depends on whether they enter a storefront and order an application instance, or are invited to share one, and whether they will pay for their own use of the application instance.

These centers are implemented as a set of Domino forms, and associated agents are used to register a customer with the service provider's back-end system. The customer sees these forms as Web pages during the process of ordering an application or accepting an invitation to share an application instance. The DIH hosting system supplies a database containing sample versions of these forms and agents. Service providers can modify these forms and agents to meet the requirements of their own systems.

The Account Clearing Center participates in the gathering and validation of customer payment information. During the registration process, the customer is led to pages which collect customer and payment information, report this information to the service provider's back-end system, and create a unique account identifier for this customer. This account identifier is the key link that associates usage information records stored in the Domino Instant! Host relational database with customer service records stored in the service provider's back-end systems. Domino Instant! Host provides a sample flat-file based Account Clearing Center, but service providers must replace the sample files with calls to their own back-end system.

The central services 64 contain the following components:

A Usage Tracking System (UTS), which collects and aggregates Web usage information, and writes it to the DIH hosting system relational database 22. Service providers can use this data for billing.

The Registry server, which writes to the registration tables in the Domino Instant! Host relational database (and also calls the Directory server to update the data in the DIHUsers databases on the Hosting servers).

The Service Provider Account Clearing Center functions, which call the back-end system to validate customer payment methods and store customer accounting information. The DIH hosting system calls the Account Clearing Center functions during the registration and invitation processes. These functions are accessed by Account Clearing Center. Web pages, which are located outside of the firewall, on the machine with the user access components.

The License server, which tracks and manages The DIH hosting system licenses, reading in the information in the license databases stored on each Hosting server.

The System monitor, which monitors the other components of the Engine and the Net Manager and posts notices for the system administrator if any of the components become unavailable.

The net Manager, a program that is used by all of the DIH hosting system components to locate each other.

The system management portion 66 of the DIH hosting system consists of these components:

The Warehouse, a Notes database that stores applications available at a service provider's site.

Customer Service Console, which allows a service provider to manage customers and instances.

Log server, which captures and reports error messages from the DIH hosting system components.

The Warehouse is a Notes database that services as a central repository for all applications that are available at a site. A service provider installs applications using an application registration process that extracts information from the AppKit provided by the application developer, such as the application's source files, marketing materials, and legal agreement. Application registration allows the service provider the opportunity to inspect and modify the application and its documents before making the application available to customers by publishing it to a storefront.

When a service provider is ready to offer an application to customers, he or she creates an application syndicate in the Warehouse. A syndicate is an offer of an application, including rental terms and pricing. Each syndicate can have a different set of materials, allowing the service provider to offer different pricing structures to different customers.

Once a syndicate has been created, the service provider publishes it to a storefront to make it available to customers.

This Domino database provides access to the DIH hosting system relational database for information about customers, groups, and instances. The Customer Service console is designed for Web access by service provider customer service or administrative staff, allowing them to view instance information, view and change login information, move instances, and suspend and restore users and instances. Different capabilities are offered to the different audiences through the use of Domino roles.

The service provider uses the Log server to see error messages from the DIH hosting system components and the results of the System Monitor. The Log server can record information in a Notes database, in a flat file, to a console, or to any combination of these.

The DIH hosting system relational database 22 stores the following information:
  Registration data, such as customer name, e-mail address, and payment method.
  DIH hosting system events, such as the creation of new instances, the invitation of new customers, or application-generated log events.
  Web Usage data, such as megabytes transferred, and database size.

The DIH hosting system relational database 22 may be implemented using either a set of flat files or any ODBC-compliant RDBMS.

The relational database server can be dedicated to the DIH hosting system or used for other relational database applications as well, but the integrity of this server is extremely important. The service provider uses the SPI to access this data, or writes standalone SQL programs to directly access the data.

A key feature of Lotus Domino is the Public Address Book (NAMES.NSF), and the user authentication support it provides. Typically, the Public Address Book is shared by multiple applications, but that is not appropriate in a hosting environment where it is important to separate users and data. Therefore, the DIH hosting system blocks applications from directly accessing the Public Address Book, and instead uses a virtual name and address book, which is implemented using cascaded Public Address Books (named DIHUsers.NSF, by default) and either a relational database or flat files.

The virtual name and address book uses the registration data (user name and e-mail address) to make sure customer names are unique throughout the service provider's hosting system site, and to limit an instance's access to its own data. The virtual name and address book can grow to accommodate a large number of customer names, yet it ties in with the Public Address Book to authenticate users and ensure access control.

The service provider uses the SPI and Customer Service Console to access information in the virtual name and address book. The application developer or ISV uses the API to invite users to share an application, and the status push technology to track the status of an invitation.

Figure 4:
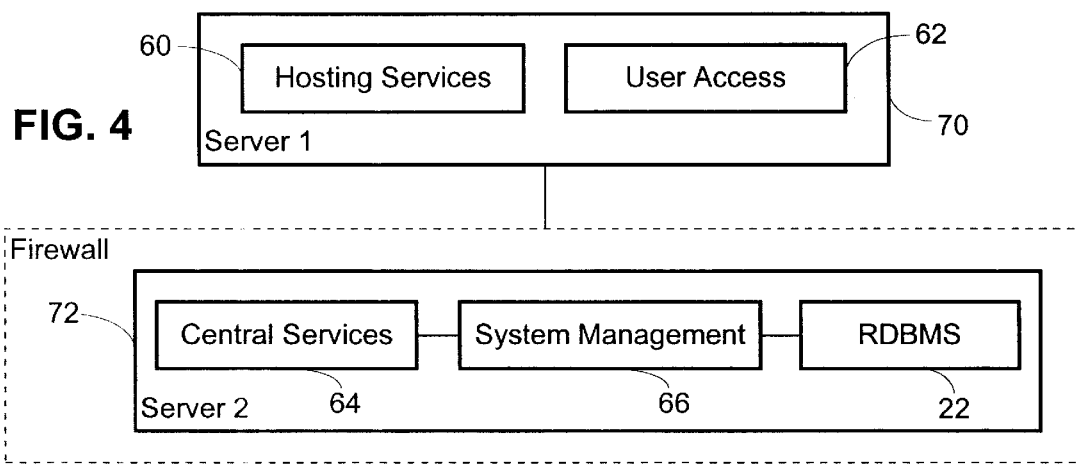
FIGS. 4–6 are block diagrams showing different configurations of the server components of FIG. 3.
Figure 5:
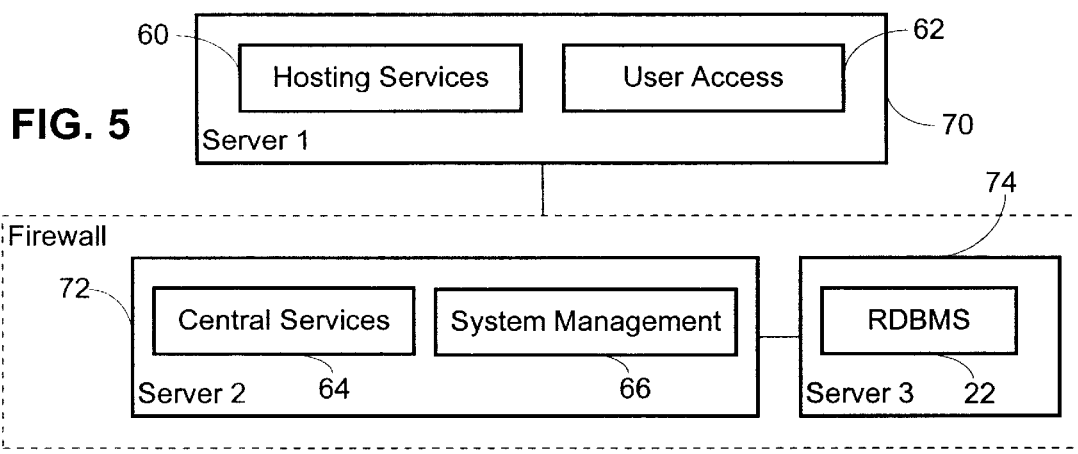
Figure 6:
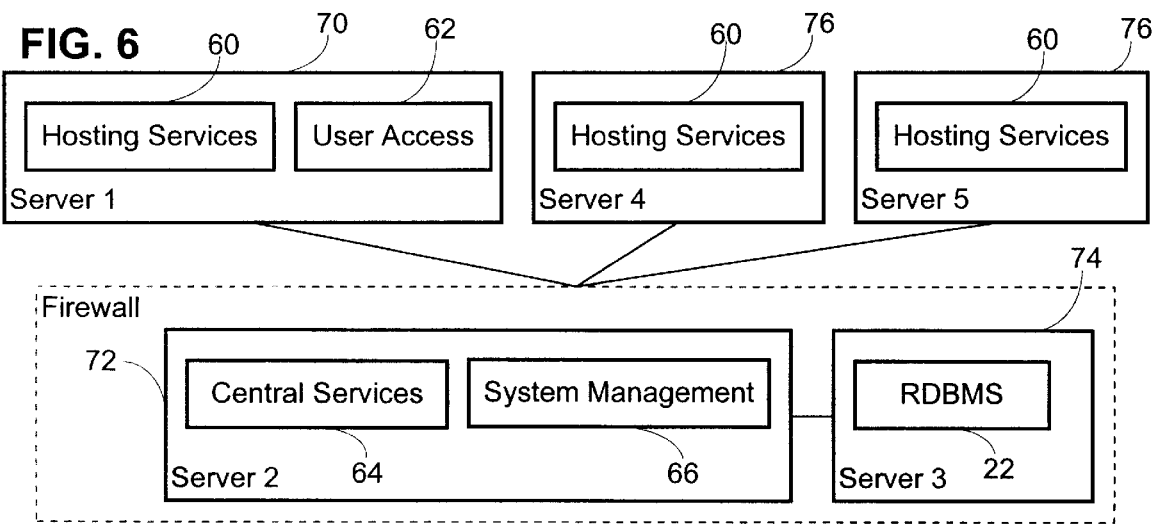

The DIH hosting system components shown in FIG. 3 may be distributed on one or more ISP computers in several different configurations. Several such configurations are shown in FIGS. 4–6. As shown in FIG. 4, in one configuration, the central services 64 and system management functions 66 with the ISP's database 22 reside on a server 72 located inside the ISP's firewall and are thus protected from intrusion, while the hosting services 60 and user access system 62 reside on a separate server 70 located outside the firewall and are thus accessible to users. As shown in FIG. 5, the ISP database 22 may be located on a server 74 separate from the central services server 72.

As shown in FIG. 6, the hosting capability is increased linearly by adding additional host servers 76 outside the firewall upon which reside duplicate hosting services 60. These host servers 76 may have different capacities and capabilities useful for different types of applications.

Figure 7:
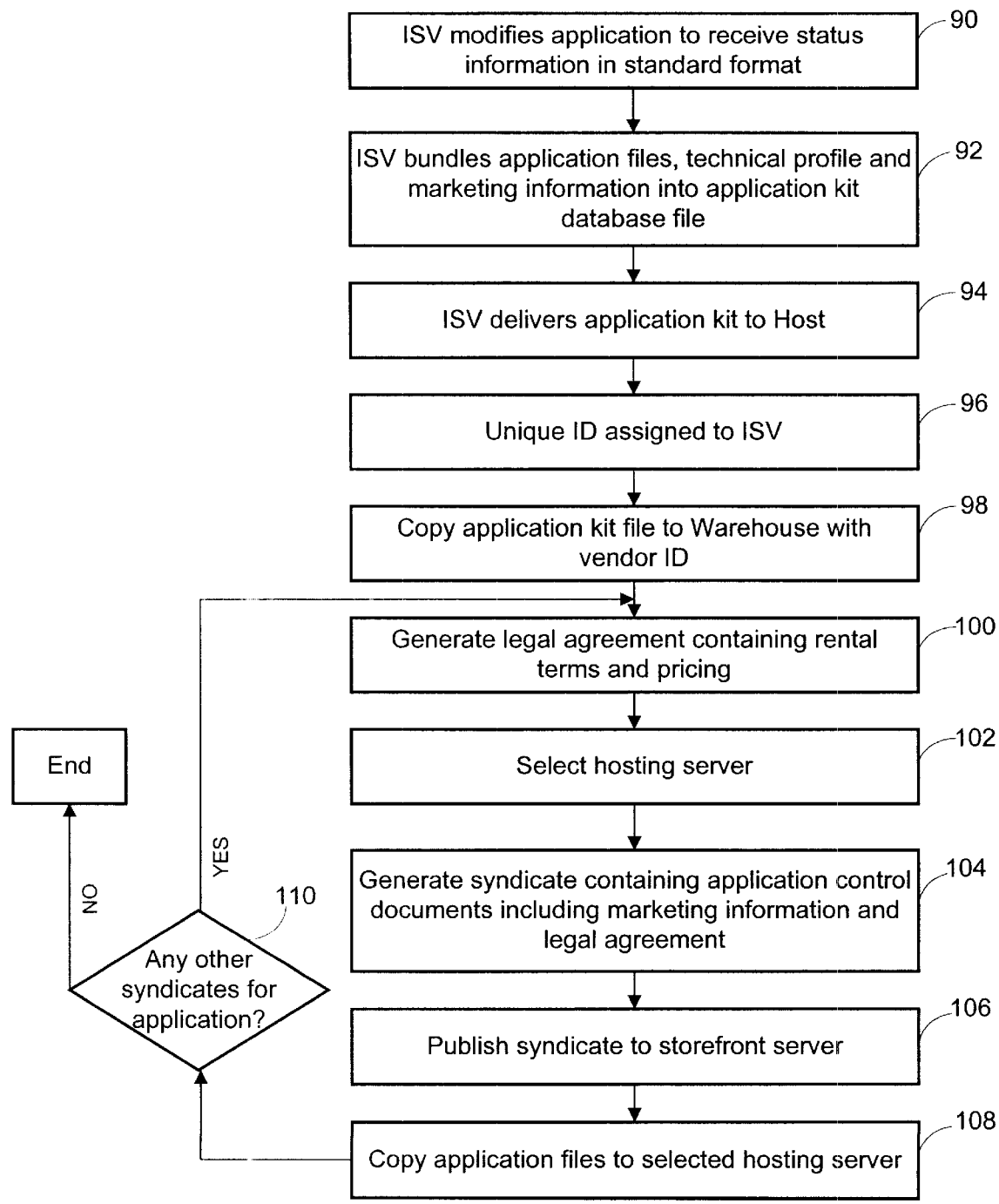
FIG. 7 is a flow chart showing a process of establishing a collection of hostable applications in accordance with one embodiment of the present invention.
Figure 12:
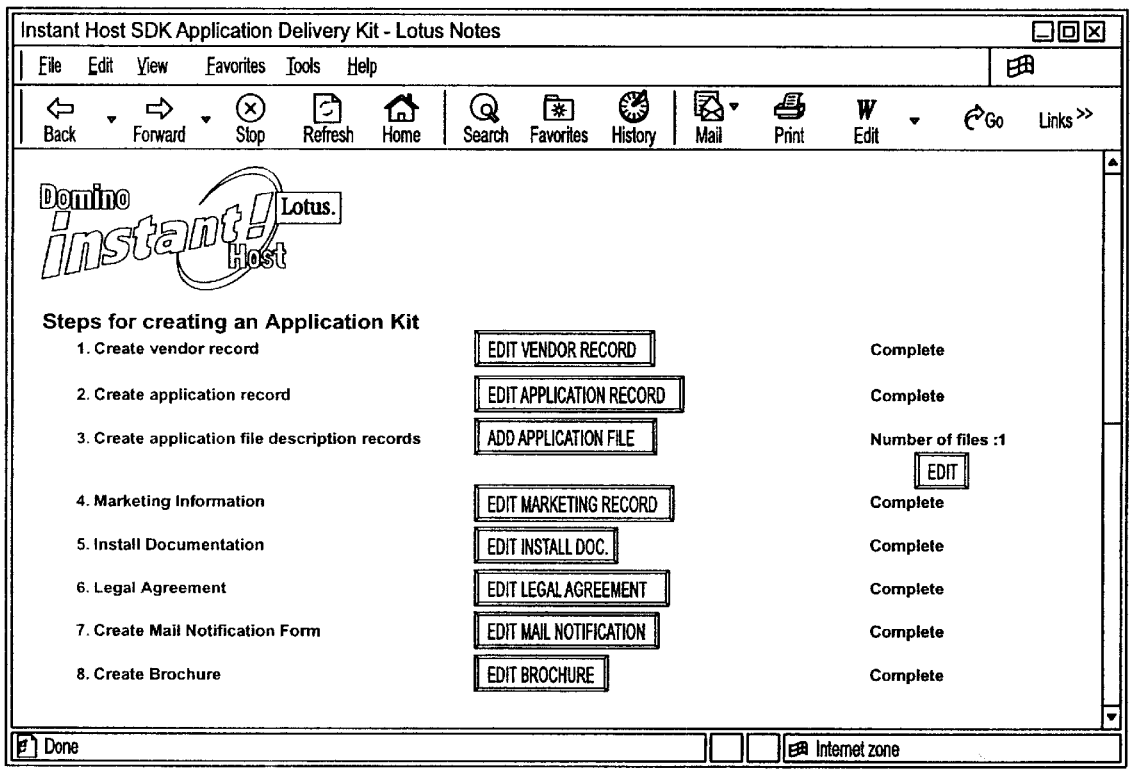
FIG. 12 is a screen display showing details related to the preparation of application kits in accordance with one embodiment of the present invention.

The overall process of preparing applications for hosting and establishing the storefront is set forth in FIG. 7. Additional details regarding the preparation of application kits in the DIH hosting system of the preferred embodiment are provided with reference to the screen display shown in FIG. 12.

The ISV must make certain modifications to its application to support the receipt of status information, step 90. As described in greater detail below, the hosting system contains a mechanism by which user and invitation information is fed from the host g system to an application instance. To receive the information, in preferred embodiments the ISV copies two forms and two views, one of each for users and one for invitations, as described below, from a template file into the application. The existing part of the application may be used, or a separate database provided to hold the information. The ISV may add any desired information into the forms and hide or show any fields, but may not rename any fields. The ISV may make additional copies of the views to modify.

The ISV next creates an application kit or AppKit, step 92, by bundling the application files, including the executable files such as .EXEs or .DLLs and any other supporting files needed to run the program, such as text, graphics or data files, with other application related information such as a vendor record providing company information about the ISV and an application record providing information about the application. In preferred embodiments, the status database is included as a .NTF file in the AppKit, and the application record contains the name of the status database file including in the AppKit. Additional information may be included in the AppKit as illustrated with reference to FIG. 12, including installation instructions, a legal agreement, a mail notification message which appears in emails to invited users, and an additional brochure for providing additional information to interested users.

The ISV delivers the AppKit to the host, step 94, such as by transmitting the file over the Internet or other communications network. Upon receiving the AppKit, the host assigns a unique vendor ID to the ISV, step 96, if one has not already been so assigned. The application kit is then copied into the warehouse along with the vendor ID, step 98.

To include the application received from the ISV in the storefront, the ISP generates a legal agreement, step 100, which may contain legal terms from the AppKit and which additionally contains pricing terms for rental of the application. In addition, a hosting server must be selected if more than one is available, step 102. The selection of the hosting server may be based on the technical requirements provided by the ISV, and may alternatively take into consideration other factors such as pricing, load balancing, etc. The host system then generates a syndicate or offering, step 104, which contains the legal terms and marketing information retrieved from the application kit. The syndicate is then published to the storefront, step 106, such as by inserting the information into the storefront documents in accordance with a predefined template. In addition, the application files from the AppKit are copied onto the selected host server, step 108, so that an instance of the application may be created when ordered.

Figure 13:
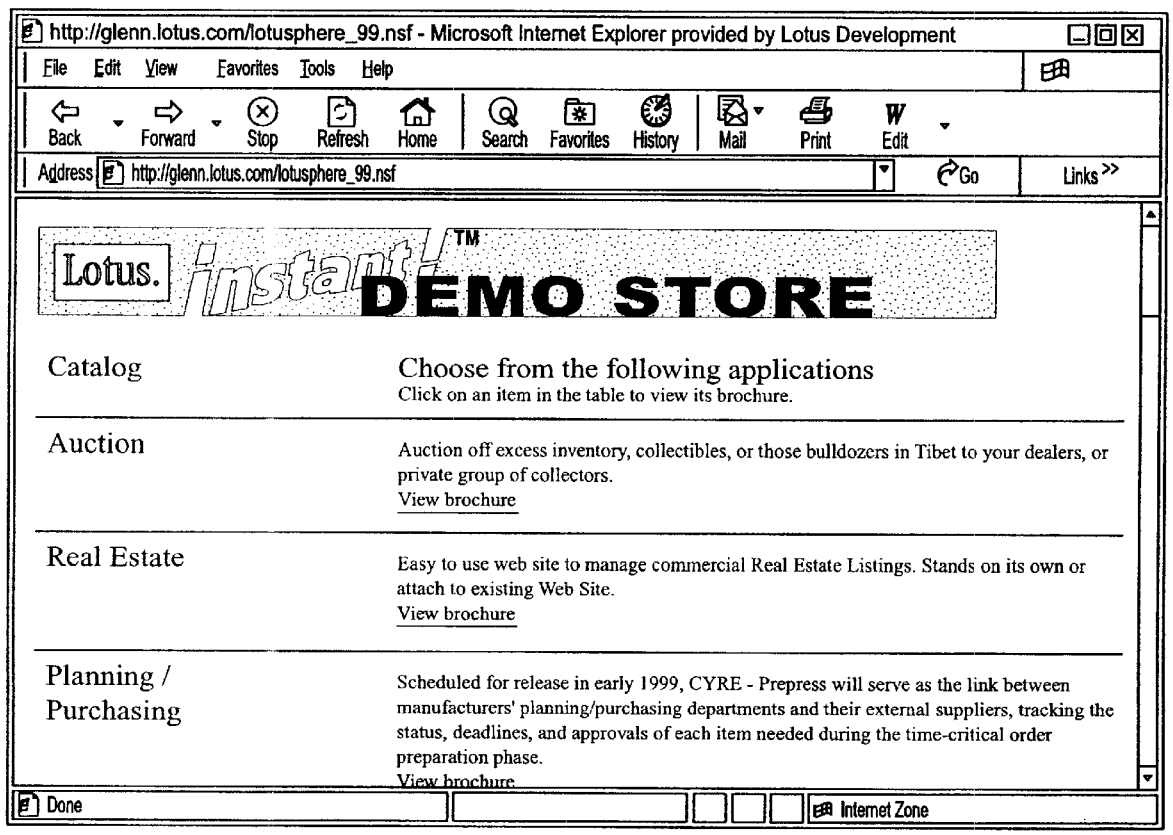
FIG. 13 is a screen display showing an example storefront embodied as an HTML document in accordance with one embodiment of the present invention.

In accordance with an advantageous feature of the present invention, a number of syndicates may be created for each application. Thus, several pricing arrangements may be devised for the same application, which may be offered to different classes of users. If other syndicates are to be created, step 110, the process is repeated. A unique syndicate identifier may need to be assigned to each such syndicate. In addition, syndicates may be categorized or otherwise organized into groups or classes based on the types of applications, the pricing terms, the targeting or eligible users, etc. An example storefront embodied as an HTML document stored on a web server is shown in FIG. 13.

Figure 8:
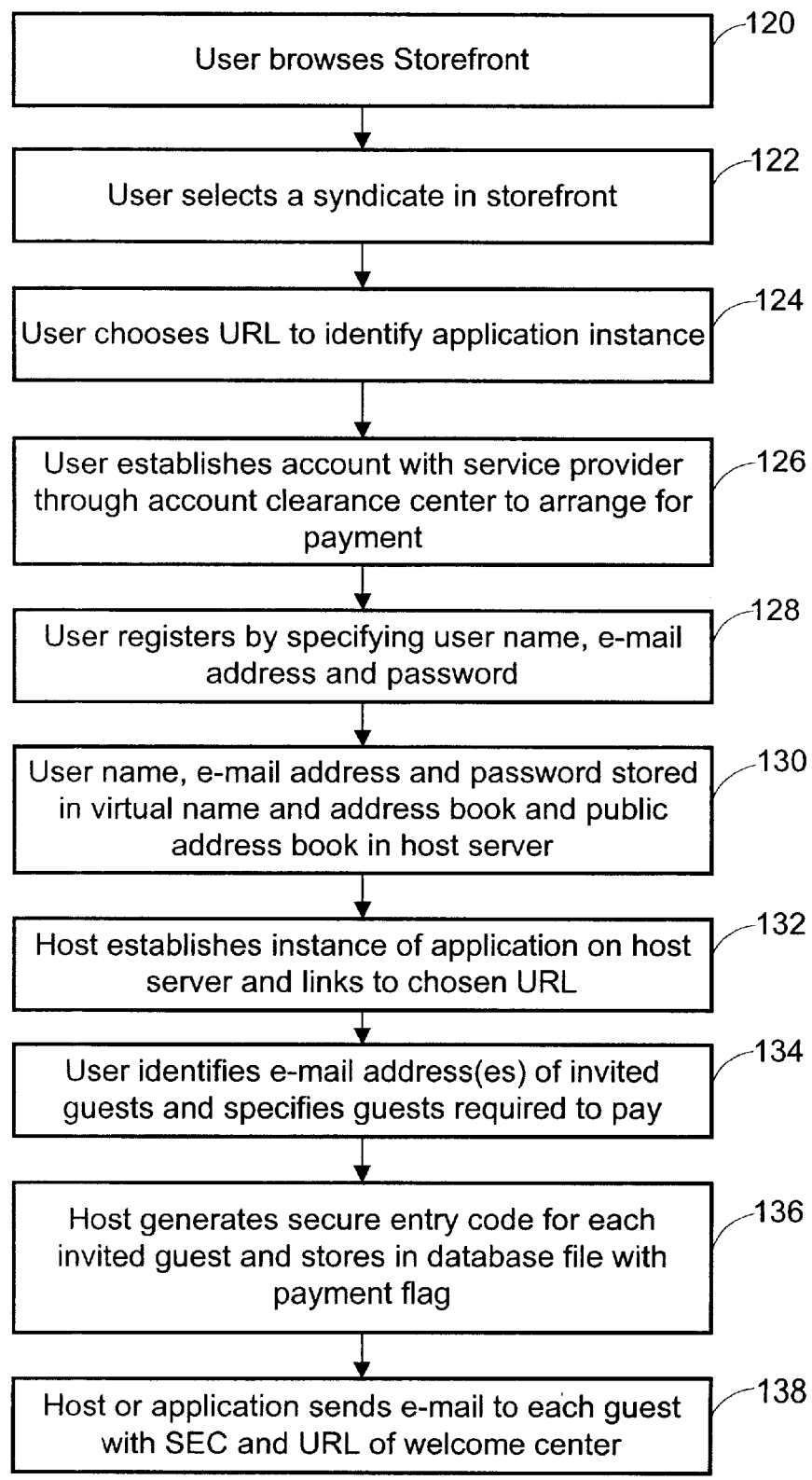
FIG. 8 is a flow chart showing a process of allowing users to establish a hosted application in accordance with one embodiment of the present invention.
Figure 9:
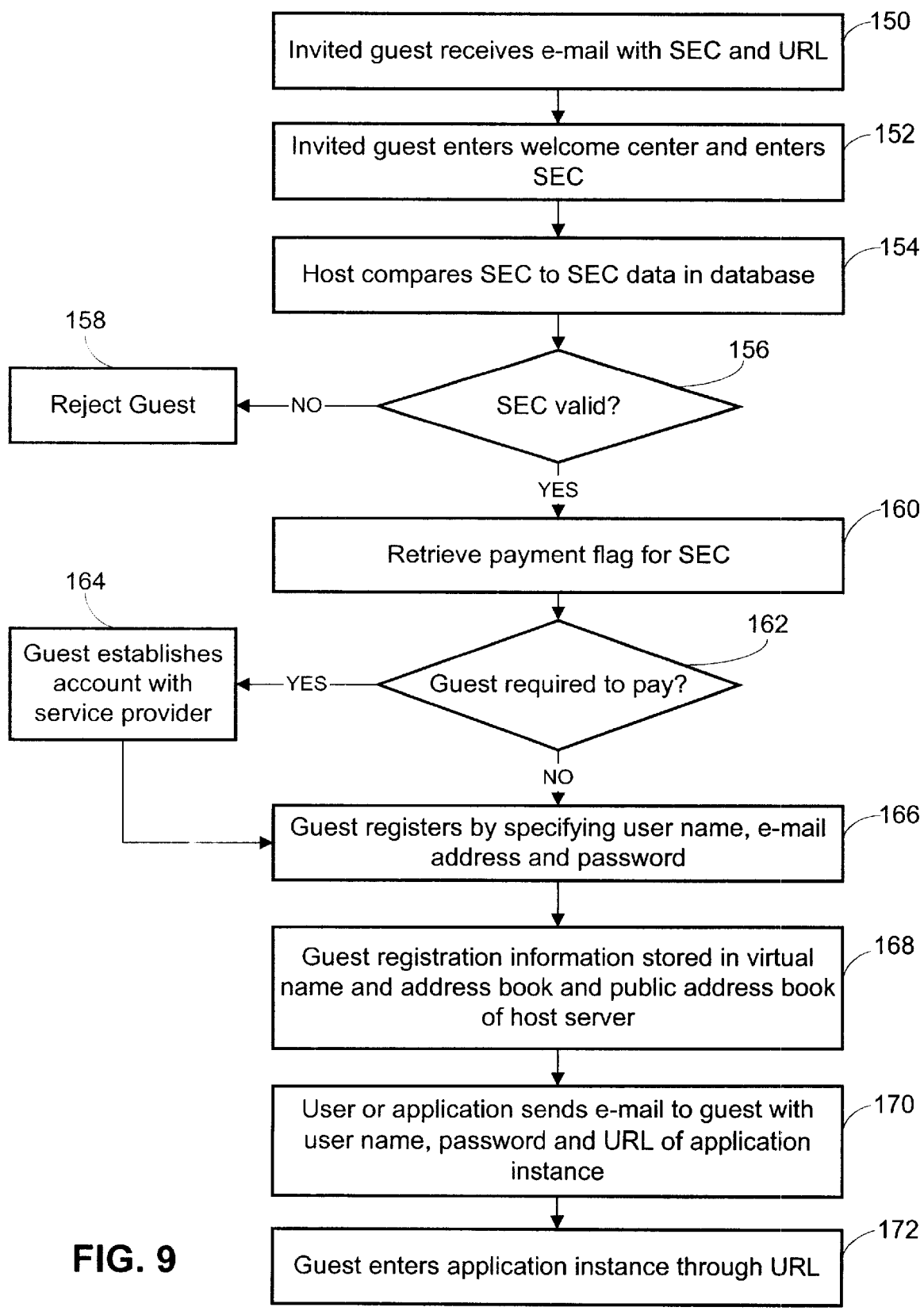
FIG. 9 is a flow chart showing a process of registering guests invited to join in a hosted application in accordance with one embodiment of the present invention.

Referring now to FIG. 8, users browse the storefront using a client application such as a conventional web browser, step 120. A user can view the marketing and pricing information about each syndicate. The user selects a syndicate in the storefront, step 122, and chooses or specifies a URL to identify the location of the application instance to be generated on the host server, step 124. In preferred embodiments in which the hosting system is an ISP, users authorized to select syndicates are customers of or those having accounts with the ISP. The user must input information to establish an account with the ISP, step 126, either by arranging for payment terms or inputting an account identifier for an existing account of the user or another such as the user's employer. The user must also register with the host system by entering a user name, email address and password, step 128. This registration information is stored in a virtual name and address book as well as a public address book in the host server, step 130.

Concurrently with or following user registration, the host establishes a protected or private copy of the application on the designated host server, step 132. This application instance is linked to the URL chosen by the user. The user also specifies by email address or otherwise one or more other users who are invited to join the application and, for each such invited user, whether that user is required to pay in order to join the application, step 134. For each such invited user, the host system generates a unique secure entry code or SEC and stores the SEC in a database file in association with the application instance and a payment flag indicating whether the user is required to pay, step 136. The host system or application then automatically sends an email message to the user, which includes the SEC, a response URL for linking to the Welcome Center (as distinguished from the chosen URL for the application instance), and possibly the additional information retrieved from the mail notification field of the respective AppKit, step 138.

Upon receiving the email message, step 150, the invited user links to the Welcome Center using the URL supplied in the email and inputs the SEC provided in the email, step 152. The access system compares the input SEC with the SECs stored in the database files, step 154. If the SEC is not valid, step 156, the guest is rejected, step 158, and may be sent a message to input an appropriate SEC. In alternative embodiments, the SEC may not be valid if the return email address of the invited user does not match the email address specified by the inviting user.

If the SEC is valid, the access system retrieves the payment flag from the database file, step 160. If the guest is required to pay, step 162, the guest establishes an account with the service provider, step 164. In any event, the guest also registers by providing a user name, email address and password, step 166. The guest registration information is stored in a virtual name and address book and the public address book of the host server, step 168. When complete, the inviting user or application sends an email message to the guest containing the URL chosen by the inviting user to identify the location of the application instance, step 170.

The email may also contain the guest's approved and registered user name and password. The guest then enters the application by linking to the host server through the URL, step 172.

During use of the application instance, the host system tracks use of the application for billing and accounting purposes. The DIH host system uses three tools for tracking users. The first is registration tables in the DIH relational database, which store account IDs that represent each user in each instance and username/e-mail pairs that uniquely identify each user. A second is a cascaded Public Address Book, which stores user records for each person with instances on each hosting server. Each entry in the public address book matches a user name specified in the registration tables. A third is the Public Address Book, which stores groups for each instance, and specifies which users have access to which groups. In addition, the ISP's back-end billing system store at least two values, including a payer ID, which represents any user who pays for access to an instance, and an account ID, which represents a single user in a single instance. The account ID is the only number communicated between the back-end billing system and the DIH host system. Furthermore, the ISP's billing system keeps track of who pays for each user's access to instances.

The host system contains several facilities for tracking usage and billing. The engine reports usage event data such as instance creation and user deletion and application-generated event messages into the host system RDBMS events table, which stores information about host system events, such as the creation of a new application instance or the invitation of new users. The event information is sufficient for a service provider to develop a simple flat-rate billing model. The application-generated event messages are determined by the application provider and sent to the engine by the a log event API call from the application. The application provider may work out an arrangement with the service provider to use these application-generated event messages for billing. For example, an application-generated message may indicate that a customer has used an expensive option in the application and is to be charged extra.

Another facility for tracking usage and billing is the Usage Tracking System ("UTS") contained in the central services. The UTS collects information from the Domino HTTP access log and aggregates it in a Web Usage relational database table, making it available to the service provider for billing. The UTS information may be used by service providers to develop a billing model based on disk space usage or megabytes transferred.

The License Server in the central services and the license databases on the hosting servers track and manage user instance month or UIM consumption, as described further below, and provide user access information that service providers can use to charge their customers on a per-access basis.

In particular embodiments of the registration process for both the initial user and invited guests, the access database of the host system ensures that users have unique names. When a user registers, one of the following events happens:

1. If the user's name has no match in the host relational database, it is accepted and added to the database and the cascaded Public Address Book.

2. If the user's name matches a name that already exists, the host system compares the e-mail address with that in the relational database. If both the name and the e-mail address match the values in the database, the host assumes that this user is already registered, and uses the existing Public Address Book entry (and password) for the user. If the e-mail addresses are different, the host system rejects the user name. In the case of a user entering the Welcome Center, the host system informs the user that the name is already in use by another user, and he or she must choose a new name. In the case of a user who is added directly to an application, the function that adds the user returns False.

If the e-mail address matches an existing address, but the user name is different, the host system creates a new account.

A user can use the same registration identity for more than one application instance, by entering the same name and e-mail address whenever the user registers to use an application. Alternatively, the user can enter a different name every time the user registers to use a new application. For example, a user might use his or her formal name and business e-mail address for some applications, and a nickname and personal e-mail address for others.

During use of an application instance, registration or account information may change, thus changing the eligibility of one or more users to use the application or the continued need for the application instance to be active. In accordance with one aspect of the present invention, status push is a mechanism and methodology by which user and invitation information is fed from the host system to an application instance. When an application supports status push, its use is triggered at various different times, and information is written to special forms in the application, incorporated by the ISV as explained above. An application can use these forms to display state information back to users of the application.

In particular embodiments, information is pushed by the Welcome Center, Registration Center, and Customer Service Console. The DIH host system tracks two different types of information, including information about active users and information about invitations.

When storing the status push information, the status push database generates one document for each SEC and one for each user. The status push process provides the following information for each SEC or invitation generated by the application:

the Secure Entry Code (SEC) used to access the invitation;

the name of the person who issued the invitation;

the user name and e-mail address that the inviter specified for use with this instance;

who is paying for the invited user or users;

the number of invitations associated with this SEC;

the date the SEC was created;

the number of invited users who have registered using this SEC;

the dates that the first and last invited users registered using an invitation for multiple guests;

the status of the invitation, such as:

None—that no user has visited the Welcome Center using this SEC;

Read—that at least one user has visited the Welcome Center using this SEC, but no user has completed the registration process;

Registered—that at least one user invited with this SEC registered to use the application; and Revoked—that the SEC was revoked by the service provider after the invitation was issued.

For each instance user, status push provides this information:

the user's name.

the e-mail address, if it was set to have a separate value in this instance.

the SEC with which the user accessed this instance. If the SEC field is empty, the user is either the instance owner or was added directly to the instance.

the date this user record was created.

the user's status, including:

Active—that the user has access to this instance.

Suspend—that the user has been suspended from this instance.

Removed—that the user has been removed from this instance.

The application instance then responds to the updated information received via the status push mechanism in accordance with predefined logic. For example, receipt of status information that an invited user has been suspended or removed may cause the application instance to revoke the privileges of the invited user or terminate the application instance for reformulation with the allowed users.

Figure 10:
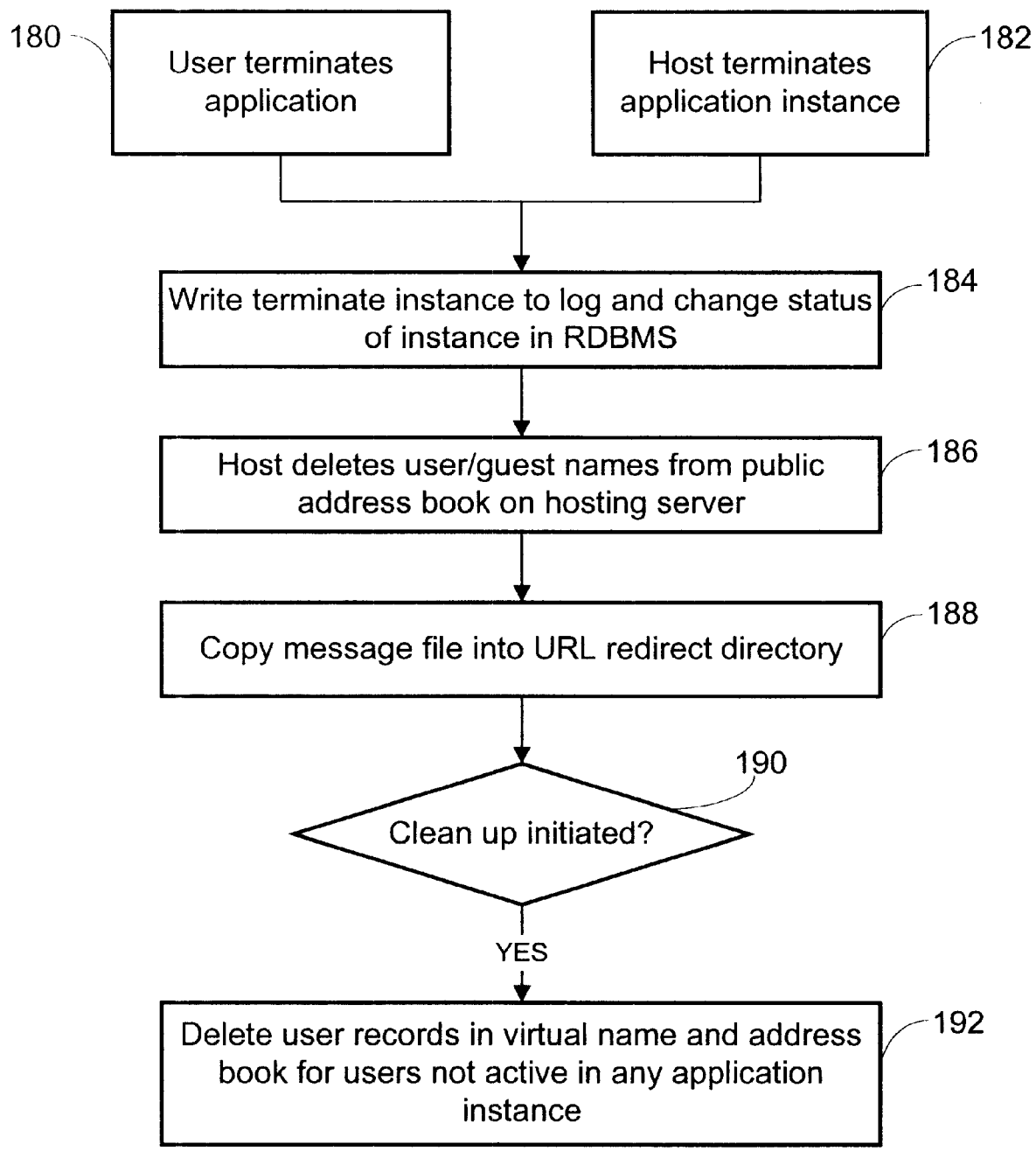
FIG. 10 is a flow chart showing a process of terminating a hosted application in accordance with one embodiment of the present invention.

Referring now to FIG. 10, when an application instance is terminated, either through an action by the user hosting the application, step 180, or through an action by the host system to so terminate it, step 182, a terminate instance is logged and the status of the instance is changed in the RDBMS, step 184. The host system deletes the names of the user and guests from the public address book on the hosting server, step 186, thus making them inaccessible to the application instance. A message file indicating the termination of the instance is then copied into the URL redirect directory, step 188, so that users attempting to access the application instance are properly notified of its termination. If desired, a clean up action may be initiated, step 190, which causes user records to deleted in the virtual name and address book for all users no longer active in any application instance, step 192.

The usage and tracking capabilities of the host system of the present invention allow ISPs to charge users in many different ways for use of the hosted applications. In particular embodiments these ways include a flat rate; a rate per user/per month; a rate for disk space usage/month; megabytes transferred/month; and/or page hits/month. ISPs in turn pay ISVs some portion based on use of their applications. ISVs also pay the hosting system platform vendor in accordance with a formula based on use of the hosting system.

Figure 11:
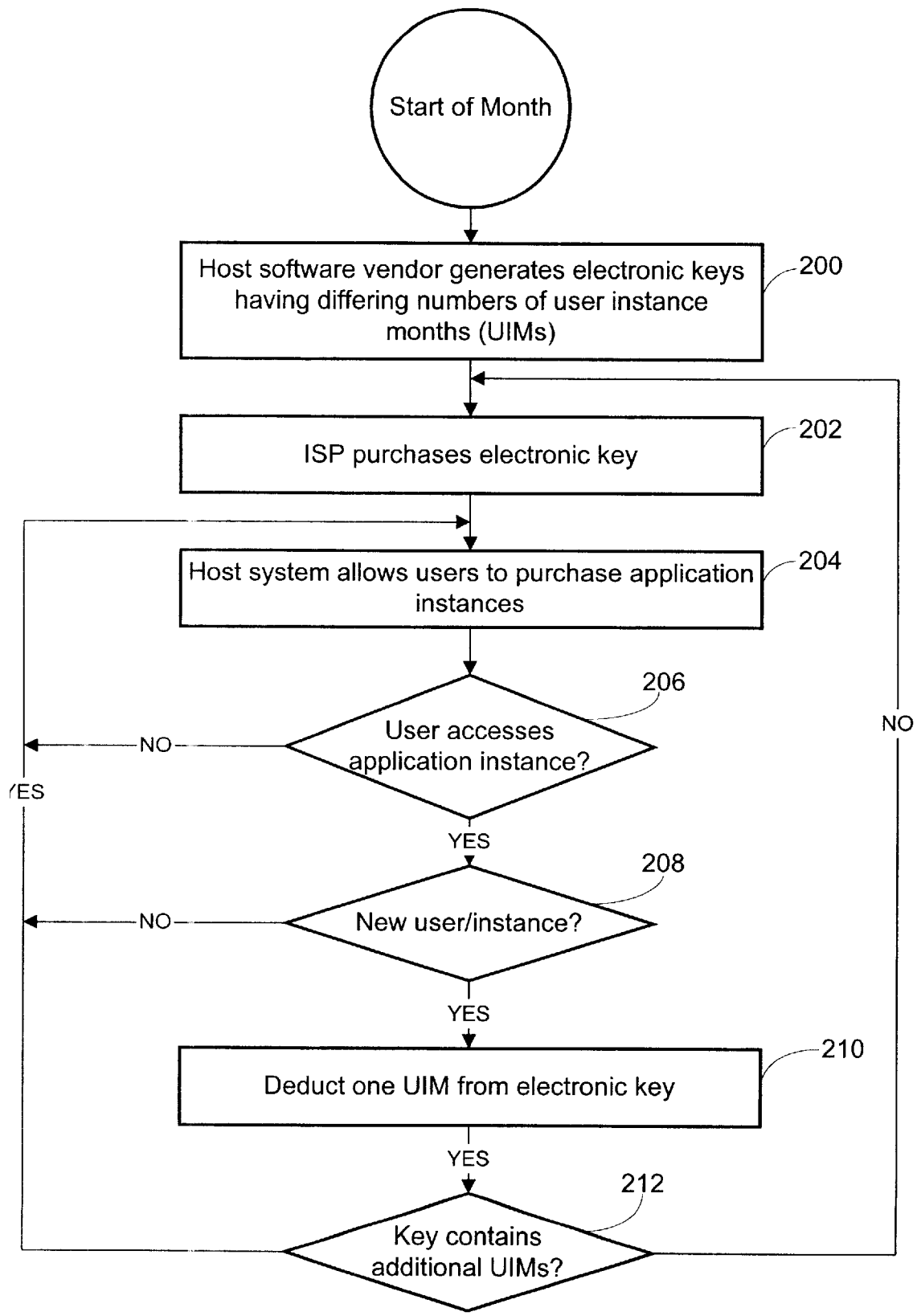
FIG. 11 is a flow chart showing a process of using electronic keys to monitor use of hosted applications in accordance with one embodiment of the present invention.

One method by which ISPs pay a hosting system platform vendor for use of the hosting system is shown in FIG. 11. At the start of every month, the hosting system vendor generates electronic keys, step 200, which are specially encoded and encrypted files that are deliverable to ISPs by download over the Internet. The electronic keys or EKeys are supplied in prepackaged quantities of User Instance Months or UIMs, with volume discounts being offered. For example, a starter Ekey may contain 375 UIMs and be priced at $500, a small Ekey may contain 3,000 UIMs and cost $3,000, and a large EKey may contain 30,000UIMs and cost $25,000. Each UIM allows one user to host one application instance during that month. The user may be allowed to access the specific application once, a specific, predetermined number of times, an application-specific number of times, or an unlimited number of times during that month.

Thus, returning to FIG. 11, the ISP purchases an EKey having a desired number of UIMs, step 202. The hosting system allows ISP users to purchase application instances as long as the EKey contains UIMs, step 204. If a user hosts an application instance, step 206, and either the user is new or the instance is new for that user, step 208, one UIM is deducted from the EKey, step 210. In one embodiment, if the user has already hosted an instance of the same application during the month, no UIM is deducted. Alternatively, a count may be kept of the number of times the user has accessed the instance during the month until that number reaches a threshold, at which point a UIM is deducted. If the EKey contains additional UIMs, step 212, the hosting system continues to allow users to host applications. Otherwise, the ISP must purchase another EKey, step 202.

As explained above, FIG. 12 shows an application kit development screen in the DIH hosting system. The DIH system uses the AppKit structure to register and publish an application. The following procedure is user to create the AppKit:

1. Using the Notes client, the ISV creates a new database from the AppKit template (DIHAppKit.NTF), and puts it in the directory specified by "Directory to find App Kits" in the System Info document in your Warehouse, as in DIH\APPKITS\.

2. The ISV opens the access control list for the AppKit database it created and makes sure that the User type for all the entries is set to Unspecified.

3. The ISV opens the AppKit database it created, and Domino Instant! Host displays the AppKit form.

4. The ISV selects "Create Vendor Record" to provide company information, and saves the document when done.

5. The ISV selects "Create Application Record" to provide basic information about the application, and saves the document when done.

6. The ISV selects each of the remaining buttons to provide additional information about the application, as indicated in the table below.

| Button | Purpose |
| --- | --- |
| Add Application File | Attach files that comprise the application. This button must be selected once for each Notes template and database in the application, as well as for each set of HTML, Java, or graphics files that share the same attributes. |
| Create Install Doc | Provide installation instructions to the service provider |
| Create Legal Agreement | Provide a legal agreement to be displayed to customers |
| Create Mail Notification | Provide text to be included in an e-mail message to customers who create an instance of the application. |
| Create Brochure | Provide more detailed marketing information for customers who are considering the application. |

As explained above, only some of the fields in the AppKit documents are used in the default storefront template that comes with the DIH host system. Customized storefronts created by service providers may use additional fields in these documents.

In sum, the present invention provides a comprehensive platform and framework for integrating groupware applications into a uniform format for hosting on a subscription basis and establishing collections of rentable groupware applications in accordance with a plurality of pricing terms. The present invention further provides an effective financial model for offering groupware applications for hosting over the Internet without requiring users to obtain any additional client-side software other than their existing conventional browsers.

The Supplement attached at the end hereof contains portions of a DIH Administration Guide and DIH Application Development Guide.

While the invention has been described and illustrated in connection with preferred embodiments, many variations and modifications as will be evident to those skilled in this art may be made without departing from the spirit and scope of the invention, and the invention is thus not to be limited to the precise details of methodology or construction set forth above as such variations and modification are intended to be included within the scope of the invention.

What is claimed is:

1. A method for establishing a collection of application software programs capable of being hosted by a user, the method comprising:

receiving on a computer system a plurality of application kits for a plurality of software applications, each application kit including executable application files and additional application related data;

creating one or more offerings for each software application contained in an application kit, each offering including at least some of the additional application related data in the application kit and pricing terms for hosting of the application;

for each software application contained in an application kit, identifying a server upon which the software application may be hosted; and publishing the offerings on a computer accessible to the user to thereby allow the user to select an offering and host the software application relating thereto on the identified server.

2. The method of claim 1, wherein the step of creating one or more offerings for a software application comprises including in the offering the server upon which the software application may be hosted.

3. The method of claim 2, comprising, for a given offering, copying the executable application files in the application kit to the server identified in the offering.

4. The method of claim 1, comprising creating a plurality of offerings for at least one software application.

5. The method of claim 4, wherein the step of creating a plurality of offerings comprises creating a first offering including first pricing terms and creating a second offering including second pricing terms different from the first pricing terms.

6. The method of claim 1, wherein the additional application related data comprises marketing information related to the software application, and wherein the step of creating one or more offerings comprises creating one or more offerings including the marketing information.

7. The method of claim 1, wherein the step of publishing the offerings comprises inserting the offerings into a template.

8. The method of claim 1, comprising storing the application kits in a database stored in the computer system.

9. The method of claim 8, wherein the step of receiving a plurality of application kits comprises receiving application kits from a plurality of software vendors.

10. The method of claim 9, comprising assigning a unique vendor identifier to each vendor and storing the application kits in the database in association with the respective vendor identifiers.

11. The method of claim 1, comprising organizing the offerings into a plurality of catalogs of related software applications, and wherein the step of publishing the offerings comprises publishing the offerings in the catalogs.

12. The method of claim 1, comprising organizing the offerings into a plurality of classes of offerings intended for particular users and limiting access to each class to the particular users intended therefor.

13. The method of claim 12, wherein the step of organizing the offerings into the plurality of classes comprises organizing the offerings into classes in accordance with the pricing terms of the offerings.

14. A computer usable medium storing program code which when executed causes a computer system to perform a method for establishing a collection of application software programs capable of being hosted by a user, the method comprising:

receiving on the computer system a plurality of application kits for a plurality of software applications, each application kit including executable application files and additional application related data;

creating one or more offerings for each software application contained in an application kit, each offering including at least some of the additional application related data in the application kit and pricing terms for hosting of the application;

for each software application contained in an application kit, identifying a server upon which the software application may be hosted; and publishing the offerings on a computer system accessible to the user to thereby allow the user to select an offering and host the software application relating thereto on the identified server.

15. The computer usable medium storing program code of claim 14, wherein the method performed by the computer comprises copying the executable application files in the application kit to the identified server.

16. The computer usable medium storing program code of claim 14, wherein the method performed by the computer comprises creating a plurality of offerings for at least one software application.

17. The computer usable medium storing program code of claim 16, wherein the step performed by the computer of creating a plurality of offerings comprises creating a first offering including first pricing terms and creating a second offering including second pricing terms different from the first pricing terms.

18. The computer usable medium storing program code of claim 14, wherein the method performed by the computer comprises organizing the offerings into a plurality of catalogs of related software applications, and wherein the step performed by the computer of publishing the offerings comprises publishing the offerings in the catalogs.

19. The computer usable medium storing program code of claim 14, wherein the method performed by the computer comprises organizing the offerings into a plurality of classes of offerings intended for particular users and limiting access to each class to the particular users intended therefor.

20. The computer usable medium storing program code of claim 19, wherein the step performed by the computer of organizing the offerings into the plurality of classes comprises organizing the offerings into classes in accordance with the pricing terms of the offerings.

21. A system for establishing a collection of application software programs capable of being hosted by a user, the system comprising:

means for receiving a plurality of application kits for a plurality of software applications, each application kit including executable application files and additional application related data;

means for creating one or more offerings for each software application contained in an application kit, each offering including at least some of the additional application related data in the application kit and pricing terms for hosting of the application;

means for identifying a server upon which each software application contained in an application kit may be hosted; and means for publishing the offerings on a computer accessible to the user to thereby allow the user to select an offering and host the software application relating thereto on the identified server.

22. The computer usable medium storing program code of claim 14, wherein the step performed by the computer of creating one or more offerings for a software application comprises including in the offering the server upon which the software application may be hosted.

23. The computer usable medium storing program code of claim 22, wherein the method performed by the computer comprises, for a given offering, copying the executable application files in the application kit to the server identified in the offering.

24. The computer usable medium storing program code of claim 14, wherein the additional application related data comprises marketing information related to the software application, and wherein the step performed by the computer of creating one or more offerings comprises creating one or more offerings including the marketing information.

25. The computer usable medium storing program code of claim 14, wherein the step performed by the computer of publishing the offerings comprises inserting the offerings into a template.

26. The computer usable medium storing program code of claim 14, wherein the method performed by the computer comprises storing the application kits in a database stored in the computer system.

27. The computer usable medium storing program code of claim 26, wherein the step performed by the computer of receiving a plurality of application kits comprises receiving application kits from a plurality of software vendors.

28. The computer usable medium storing program code of claim 27, wherein the method performed by the computer comprises assigning a unique vendor identifier to each vendor and storing the application kits in the database in association with the respective vendor identifiers.

* * * * *